United States Patent Office 3,271,175
Patented Sept. 6, 1966

3,271,175
AZIRIDINYL PHOSPHONITRILE GELATIN
HARDENING AGENT
Donald M. Burness and Melvin D. Sterman, Rochester,
N.Y., assignors to Eastman Kodak Company, Rochester, N.Y., a corporation of New Jersey
No Drawing. Filed Dec. 4, 1963, Ser. No. 328,102
6 Claims. (Cl. 106—125)

This invention relates to the hardening of gelatin by incorporating certain aziridine derivatives of polymeric phosphonitriles in gelatin compositions.

Various agents have been employed for hardening gelatin such as are employed for photographic layers or as carriers for silver halide in photographic emulsions. Some of these are formaldehyde, chrome salts, dialdehydes, hydroxyaldehydes and the like. Sometimes one or the other of the compounds previously suggested for hardening purposes have exhibited disadvantages such as an effect on the sensitivity of the photographic emulsion, difficulty in handling, only moderate effectiveness or other posisble disadvantages.

One object of our invention is to provide for the hardening of gelatin such as is used for photographic layers by incorporating azirdine derivatives of polymeric phosphonitriles in compositions thereof. Other objects of our invention will appear herein.

We have found that certain aziridine derivatives of polymeric phosphonitriles are very effective hardeners for gelatin compositions. These compounds are easy to handle, have a wide range of application and little or no toxicity. These compounds have been used as hardeners in various photographic emulsions and have not deleteriously affected the sensitivity thereof.

A general formula for these compounds is designated I, wherein A represents either a halogen atom or an aziridine ring, either unsubstituted or containing an alkyl group of 1–4 carbon atoms. At least 2 (and preferably 4 or more) of the A substituents should be aziridine rings. The aziridine rings are attached to the phosphorus atoms through the aziridine ring nitrogen.

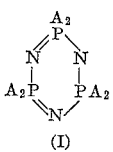

(I)

The eight-membered compounds are also useful as hardeners in gelatin compositions, these compounds having the structure represented by the following Formula, II, wherein A represents an aziridine ring or halogen as related above. Here again at least 2 (and preferably 4 or more) of the A substituents should be aziridine rings.

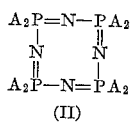

(II)

These hardeners are conveniently prepared from phosphonitrilic chloride trimer (or tetramer) and the requisite aziridine base, such as in the manner described in Rätz and Grundmann, U.S. Patent No. 2,858,306. Example I of that patent gives a detailed description of one convenient method of making the derivatives involving a six membered ring and Example III of that patent relates to the making of these derivatives having the eight membered ring. In the actual preparation of these hardeners, the reaction may, if desired, be terminated before complete replacement of the halogen takes place, whereby some of the substituents on the phosphorus atoms would be halogen groups or the halogen may be entirely replaced by aziridine rings.

These compounds exhibit hardening properties within a wide range. However, generally an amount of hardener within the range of 0.5 –10% by weight based on the weight of the gelatin present is used to obtain the desired hardening effect. Obviously, if only a small amount of hardening is desired, one might elect to use a proportion of hardener even below the range designated.

The hardeners in accordance with our invention are useful for hardening gelatin not only in compositions where gelatin is the sole constituent but also in compositions where gelatin is found in admixture with other polymeric materials or where gelatin or its mixture with other polymers is used as a carrier for water insoluble inorganic compounds. For instance, the hardeners in accordance with our invention are useful in gelatin-silver halide photographic emulsions which may or may not contain additives such as sensitizers, antifoggants, etc., in baryta coating compositions and the like. These compositions may be coated out as layers upon a suitable support. Some materials which may be mixed with gelatin in compositions employed for the application of layers are poly(butyl acrylate co-acrylic acid), poly(methyl methacrylate co-methacrylic acid), phthalated poly(vinyl alcohol), phthalated gelatin, polymers having the composition

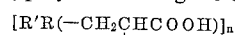

R and R' being butyl methacrylate, butyl acrylate or ethyl acrylate polymer units present in various amounts, the acrylic acid component being present in amounts ranging from 10–40 mole percent, poly(butyl acrylate co-acrylonitrile co-acrylic acid), cellulose ether phthalates, etc. or mixtures thereof. These materials may be utilized in the form of their water-soluble alkali metal or ammonium salts or may be used as dispersions such as hydrosol dispersions as is known in the art.

The following examples illustrate the preparation of compounds useful for hardening gelatin in accordance with our invention.

*Example I*

The method described in Example 1 of U.S. Patent No. 2,858,306 was carried out and there was thereby obtained hexakis(1-aziridinyl)-s-triazatriphosphorine. The product melted at 146.5–148.5° C. Analysis showed complete replacement of halogen atoms with aziridine groups.

*Example II.—2-chloro-2,4,4,6,6-pentakis(2-methyl-1-aziridinyl)-s-triazatriphosphorine*

To a solution of 154 grams of propylenimine and 274 grams of triethylamine in 1500 ml. of dry benzene was added dropwise at 10–20° C. a solution of 101 grams of phosphonitrilic chloride trimer in 500 ml. of benzene. The mixture thus obtained was stirred for 24 hours at 20–25° C. and was filtered. The resulting filtrate was subjected to evaporation at reduced pressure. The residual oil which resulted was dissolved in ligroin, the solution was treated with charcoal and the solvent was then evaporated to obtain a colorless oil of $n_D^{25}$ 1.5164.

The compounds prepared as described above were added to separate portions of a high-speed gelatin-silver bromoiodide emulsion which had been panchromatically sensitized with a cyanine dye. Each emulsion sample was coated on a cellulose acetate film support at a coverage of 432 mg. of silver and 980 mg. of gelatin per square foot. A sample of each film coating was exposed on an Eastman 1B sensitometer, processed for five minutes in Kodak DK–50 developer, fixed, washed and dried. The speed, gamma, fog and water swelling characteristics of the coating were determined. The results were as follows:

| Hardener | Conc., g./100 g. of Gel | Rel. Speed | Gamma | Fog | Percent Swell in Water |
|---|---|---|---|---|---|
| Control | | 100 | 1.30 | 0.14 | 754 |
| Example I product | 3 | 82 | 1.11 | .08 | 150 |
| Do | 6 | 76 | 1.03 | .10 | 125 |
| Control | | 100 | 1.34 | .16 | 830 |
| Example II product | 3 | 87 | 1.16 | .12 | 290 |

The percent swell in water was determined by immersing the film in distilled water at 68° F. for 5 minutes and then determining the increase in thickness of the emulsion layer.

*Example III.—2,2,4,4,6,6,8,8-octakis(1-aziridinyl)-s-tetrazatetraphosphocine*

The procedure described in Example II was followed using ethylenimine and phosphonitrilic chloride tetramer. A colorless solid having the above referred to composition was obtained.

Samples of the compound obtained in Example III were added to separate portions of a high-speed silver bromoiodide emulsion panchromatically sensitized with a cyanine dye. Each emulsion sample was coated on a cellulose acetate film support at a coverage of 459 mg. of silver and 1040 mg. of gelatin per square foot. A sample of each film coating was exposed on an Eastman 1B sensitometer, processed for five minutes in Kodak DK–50 Developer, fixed, washed, and dried. The following results were obtained.

| Hardener | Conc., g/100 g. of Gel | Speed | γ | Fog | Percent Swell in Water |
|---|---|---|---|---|---|
| Control | | 100 | 1.27 | .13 | 950 |
| Example III product | 1 | 85 | 1.08 | .10 | 350 |
| | 3 | 69 | .95 | .10 | 240 |

The invention has been described in considerable detail with particular reference to certain preferred embodiments thereof, but it will be understood that variations and modifications can be effected within the spirit and scope of the invention as described hereinabove, and as defined in the appended claims.

We claim:
1. A composition of matter comprising gelatin containing in hardening amount an aziridine derivative of a cyclic phosphonitrile in which the aziridine groups are linked to phosphonitrile by N—P bonds.

2. A composition of matter comprising gelatin containing in hardening amount a compound having the structural formula

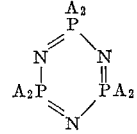

in which each A is selected from the group consisting of halogen atoms and aziridine rings both unsubstituted and substituted with alkyls of 1 to 4 carbon atoms, in which structure at least 2 of the A's are aziridine rings, the aziridine rings being linked to the phosphonitrile by N—P bonds.

3. A composition of matter comprising gelatin containing in hardening amount a compound having the structural formula

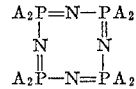

in which each A is selected from the group consisting of halogen atoms and aziridine rings both unsubstituted and substituted with alkyls of 1 to 4 carbon atoms, in which structure at least 2 of the A's are aziridine rings, the aziridine rings being linked to the phosphonitrile by N—P bonds.

4. A composition of matter comprising gelatin containing a hardening amount of hexakis(1-aziridinyl)-s-triazatriphosphorine.

5. A composition of matter comprising gelatin containing a hardening amount of 2-chloro-2,4,4,6,6-pentakis(2-methyl-1-aziridinyl)-s-triazatriphosphorine.

6. A composition of matter comprising gelatin containing a hardening amount of 2,2,4,4,6,6,8,8-octakis(1-aziridinyl)-s-tetrazatetraphosphocine.

References Cited by the Examiner
UNITED STATES PATENTS 2,858,306  10/1958  Rätz et al. _____ 260—2 X
3,186,848   1/1965  Willems et al. _____ 96—111

NORMAN G. TORCHIN, *Primary Examiner.*

ALEXANDER D. RICCI, *Examiner.*

J. H. RAUBITSCHEK, *Assistant Examiner.*